United States Patent
Harrison

(10) Patent No.: US 6,497,066 B1
(45) Date of Patent: Dec. 24, 2002

(54) AUTOMATIC FISHING LINE CASTING SYSTEM

(76) Inventor: Le Roy Harrison, 10401 Stoepel St., Detroit, MI (US) 48204

( * ) Notice: Subject to any disclaimer, the term of this patent is extended or adjusted under 35 U.S.C. 154(b) by 0 days.

(21) Appl. No.: 09/965,735

(22) Filed: Sep. 27, 2001

(51) Int. Cl.⁷ .............................................. A01K 91/02
(52) U.S. Cl. ............................................. 43/19; 124/76
(58) Field of Search ................................ 43/19; 124/65, 124/70, 29; 42/55

(56) References Cited

U.S. PATENT DOCUMENTS

| | | | |
|---|---|---|---|
| 2,958,975 A | * 11/1960 | Neff et al. ...................... | 43/19 |
| 2,977,706 A | 4/1961 | Merz | |
| 3,717,947 A | 2/1973 | Nomura | |
| 3,780,720 A | * 12/1973 | Alderson ...................... | 124/1 A |
| 4,501,085 A | 2/1985 | Barnes | |
| 5,060,413 A | 10/1991 | Garcia | |
| 5,421,116 A | * 6/1995 | Moon ............................ | 43/19 |
| 5,515,838 A | * 5/1996 | Anderson ...................... | 124/76 |
| D377,204 S | 1/1997 | Athanasiadis | |
| 5,613,483 A | * 3/1997 | Lukas et al. .................... | 124/73 |
| 5,909,000 A | * 6/1999 | Rakov ............................. | 89/7 |
| 5,996,503 A | * 12/1999 | Waoddall et al. ............ | 102/498 |
| 6,067,975 A | * 5/2000 | Ginn .............................. | 124/59 |
| 6,343,599 B1 | * 2/2002 | Perrone ......................... | 124/73 |

* cited by examiner

Primary Examiner—Charles T. Jordan
Assistant Examiner—Bret Hayes

(57) ABSTRACT

An automatic fishing line casting system for casting a fishing line connected to an elongated fishing pole. The fishing pole having a reel and a plurality of eyelets mounted along a length of the fishing pole. The fishing line extends through each of the eyelets. The automatic fishing line casting system includes an elongated barrel that has open first and second ends. A peripheral wall extends between the open first and second ends defining a bore extending through the barrel. A projectile is removably positioned in the bore of the barrel and is couplable to a portion of the fishing line. A propellant is positioned in an interior of a cartridge for propelling the projectile from the barrel. A housing is mounted to the open first end of the barrel for holding the cartridge.

19 Claims, 3 Drawing Sheets

AUTOMATIC FISHING LINE CASTING SYSTEM

BACKGROUND OF THE INVENTION

1. Field of the Invention

The present invention relates to fishing line casting devices and more particularly pertains to a new automatic fishing line casting system for casting a fishing line connected to an elongated fishing pole. The fishing pole having a reel and a plurality of eyelets mounted along a length of the fishing pole. The fishing line extends through each of the eyelets.

2. Description of the Prior Art

The use of fishing line casting devices is known in the prior art. More specifically, fishing line casting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,060,413; 2,958,975; 3,717,947; 4,501,085; 2,977,706; U.S. Pat. No. Des. 377,204.

While these devices fulfill their respective, particular objectives and requirements, the aforementioned patents do not disclose a new automatic fishing line casting system. The inventive device includes an elongated barrel that has open first and second ends. A peripheral wall extends between the open first and second ends defining a bore extending through the barrel. A projectile is removably positioned in the bore of the barrel and is couplable to a portion of the fishing line. A propellant is positioned in an interior of a cartridge for propelling the projectile from the barrel. A housing is mounted to the open first end of the barrel for holding the cartridge.

In these respects, the automatic fishing line casting system according to the present invention substantially departs from the conventional concepts and designs of the prior art, and in so doing provides an apparatus primarily developed for the purpose of casting a fishing line connected to an elongated fishing pole. The fishing pole having a reel and a plurality of eyelets mounted along a length of the fishing pole. The fishing line extends through each of the eyelets.

SUMMARY OF THE INVENTION

In view of the foregoing disadvantages inherent in the known types of fishing line casting devices now present in the prior art, the present invention provides a new automatic fishing line casting system construction wherein the same can be utilized for casting a fishing line connected to an elongated fishing pole. The fishing pole having a reel and a plurality of eyelets mounted along a length of the fishing pole. The fishing line extends through each of the eyelets.

The general purpose of the present invention, which will be described subsequently in greater detail, is to provide a new automatic fishing line casting system apparatus and method which has many of the advantages of the fishing line casting devices mentioned heretofore and many novel features that result in a new automatic fishing line casting system which is not anticipated, rendered obvious, suggested, or even implied by any of the prior art fishing line casting devices, either alone or in any combination thereof.

To attain this, the present invention generally comprises an elongated barrel that has open first and second ends. A peripheral wall extends between the open first and second ends defining a bore extending through the barrel. A projectile is removably positioned in the bore of the barrel and is couplable to a portion of the fishing line. A propellant is positioned in an interior of a cartridge for propelling the projectile from the barrel. A housing is mounted to the open first end of the barrel for holding the cartridge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automatic fishing line casting system apparatus and method which has many of the advantages of the fishing line casting devices mentioned heretofore and many novel features that result in a new automatic fishing line casting system which is not anticipated, rendered obvious, suggested, or even implied by any of the prior art fishing line casting devices, either alone or in any combination thereof.

It is another object of the present invention to provide a new automatic fishing line casting system which may be easily and efficiently manufactured and marketed.

It is a further object of the present invention to provide a new automatic fishing line casting system which is of a durable and reliable construction.

An even further object of the present invention is to provide a new automatic fishing line casting system which is susceptible of a low cost of manufacture with regard to both materials and labor, and which accordingly is then susceptible of low prices of sale to the consuming public, thereby making such automatic fishing line casting system economically available to the buying public.

Still yet another object of the present invention is to provide a new automatic fishing line casting system which provides in the apparatuses and methods of the prior art some of the advantages thereof, while simultaneously overcoming some of the disadvantages normally associated therewith.

Still another object of the present invention is to provide a new automatic fishing line casting system for casting a fishing line connected to an elongated fishing pole. The fishing pole having a reel and a plurality of eyelets mounted along a length of the fishing pole. The fishing line extends through each of the eyelets.

Yet another object of the present invention is to provide a new automatic fishing line casting system which includes an elongated barrel that has open first and second ends. A peripheral wall extends between the open first and second ends defining a bore extending through the barrel. A projectile is removably positioned in the bore of the barrel and is couplable to a portion of the fishing line. A propellant is positioned in an interior of a cartridge for propelling the projectile from the barrel. A housing is mounted to the open first end of the barrel for holding the cartridge.

Still yet another object of the present invention is to provide a new automatic fishing line casting system that permits users unable to cast a fishing line to go fishing. The present invention is particularly beneficial to the elderly and young who have either lost or have not obtained enough strength the cast a fishing line.

Even still another object of the present invention is to provide a new automatic fishing line casting system that permits users to cast a fishing line further than by hand. The present invention employs a propellant to cast the fishing line further than a user can cast by hand permitting a user to catch fish further away.

Additionally, the present invention permits a user to cast a fishing line where there is not enough room to cast. Users often fish from a bank of a river where trees pose potential entanglement hazards. The present invention permits a user to cast their fishing line by pointing their fishing pole in the casting direction. The propellant casts the fishing line to the desired location.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
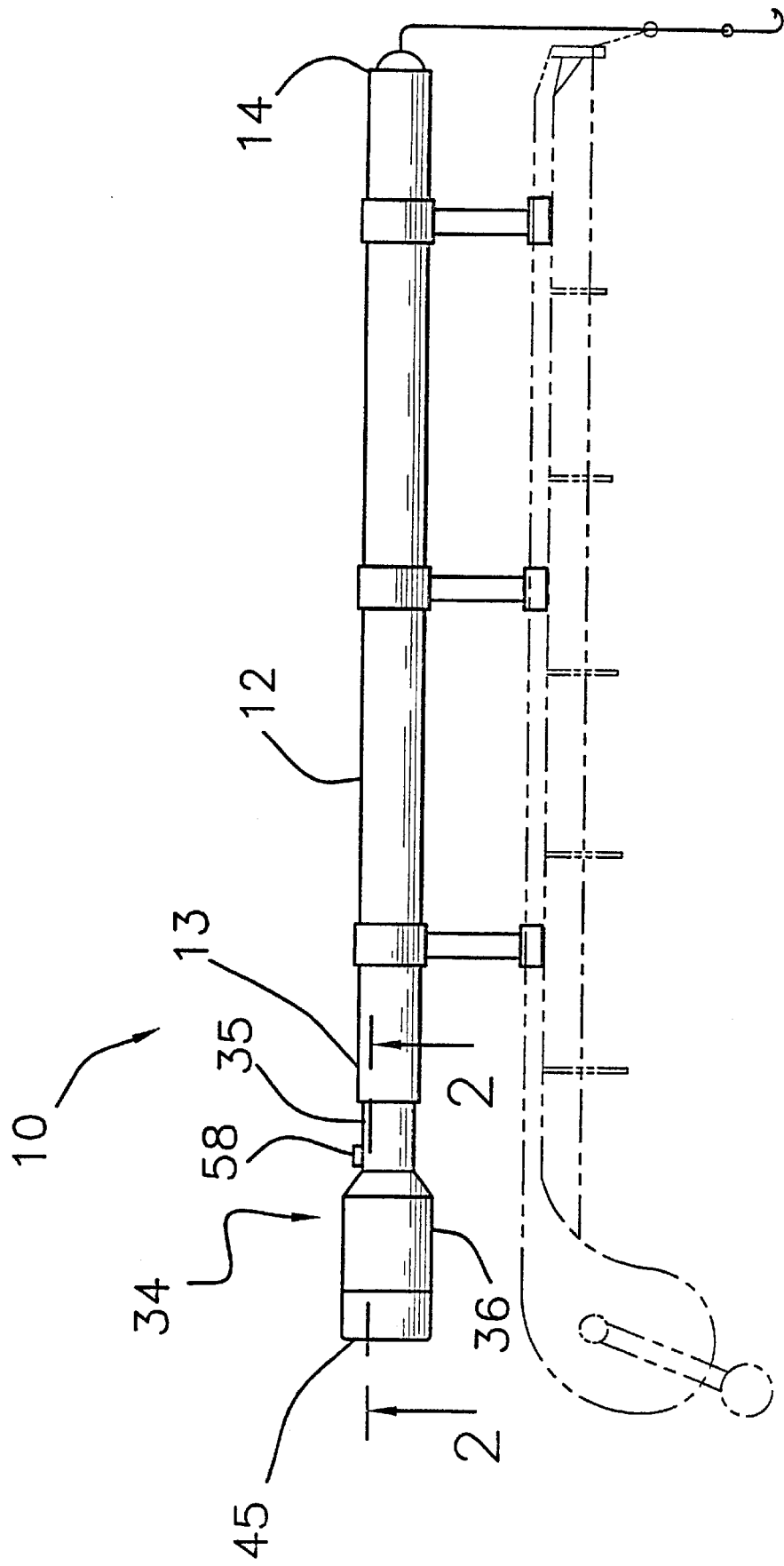
FIG. 1 is a schematic side view of a new automatic fishing line casting system according to the present invention.
Figure 2:
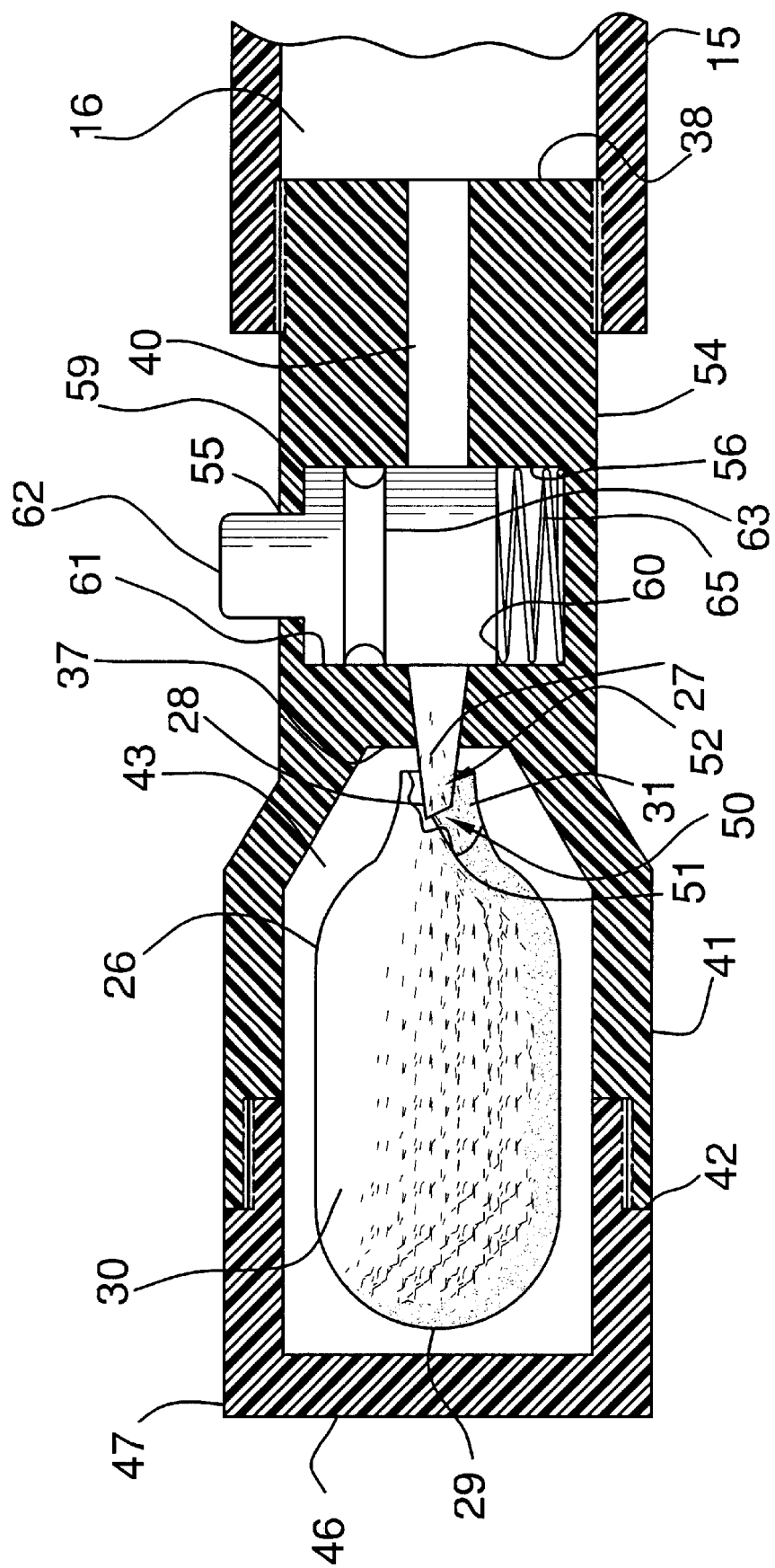
FIG. 2 is a schematic cross sectional view of the present invention taken along line 2—2 of FIG. 1.
Figure 3:
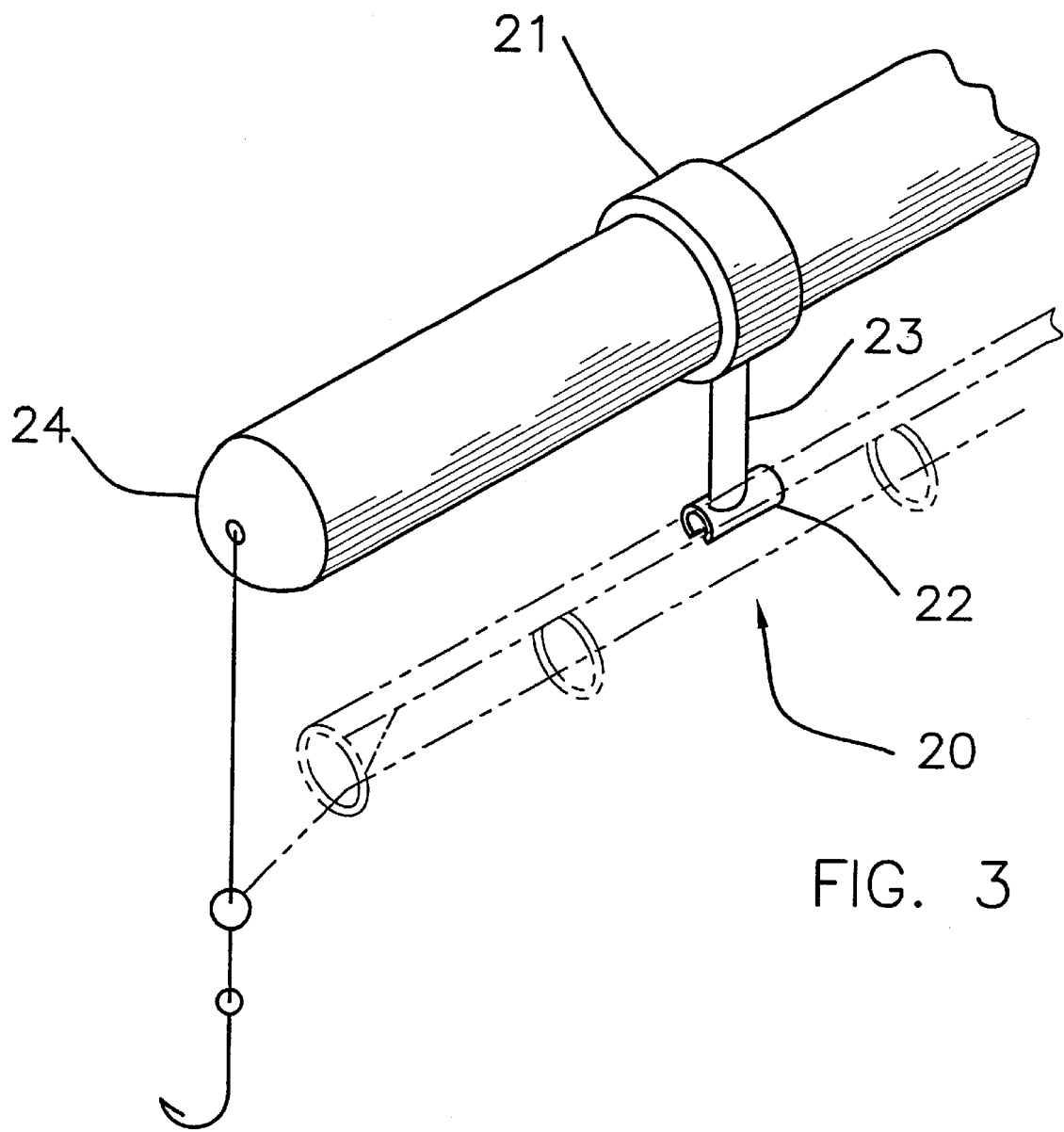
FIG. 3 is a schematic perspective view of the present invention.

With reference now to the drawings, and in particular to FIGS. 1 through 3 thereof, a new automatic fishing line casting system embodying the principles and concepts of the present invention and generally designated by the reference numeral 10 will be described.

As best illustrated in FIGS. 1 through 3, the automatic fishing line casting system 10 generally comprises a barrel 12 that has open first 13 and second 14 ends. A peripheral wall 15 extends between the open first 13 and second 14 ends defining a bore 16 extending through the barrel 12. The barrel 12 includes a longitudinal axis extending between the open first 13 and second 14 ends. The barrel 12 may have a length measuring approximately equal to a length of the fishing pole.

The barrel 12 is generally cylindrical such that the barrel 12 includes a generally circular transverse cross section taken substantially perpendicular to the longitudinal axis of the barrel 12. The barrel 12 may comprise a substantially rigid material such as, for example, a metal or plastic material. However, other types of materials may also be employed.

In one embodiment of the present invention, a fastening means 20 may be provided for removably fastening the barrel 12 to the fishing pole. The fastening means 20 may extend between and may be removably couplable to the fishing pole and the peripheral wall 15 of the barrel 12.

The fastening means 20 may include an annular member 21 that is mounted to the peripheral wall 15 of the barrel 12. The barrel 12 may extend through the annular member 21. A generally arcuate member 22 may be removably fastenable to the fishing pole and a coupling member 23 may be coupled to and may extend between the annular member 21 and the arcuate member 22. Other types of fastening means 20 may also be employed.

As illustrated in FIG. 3, a projectile 24 is provided for ejecting from the barrel 12 and carrying the fishing a distance without having to use the fishing pole to cast. The projectile 24 is preferably coupled to a portion of the fishing line extending from a tip of the fishing pole. The projectile 24 is removably positioned in the bore 16 of the barrel 12 and in one embodiment of the present invention may be positioned generally adjacent to the second end 14 of the barrel 12. The projectile 24 may be generally spherical. However, the projectile 24 may employ other shapes.

In one embodiment of the present invention, the projectile 24 may be clipped to the fishing line. In another embodiment of the present invention, the fishing line may extend through a center of the projectile. However, other means may be employed to couple the projectile to the fishing line.

As illustrated in FIG. 2, a cartridge 26 for holding a compressed propellant 27 is provided. The cartridge 26 has a first end 28, a second end 29 and a peripheral wall 30 extending between the first 28 and second 29 ends of the cartridge 26 defining an interior 31 of the cartridge 26.

The compressed propellant 27 is positioned in the interior 31 of the cartridge 26 for propelling the projectile 24 from the barrel 12. In one embodiment of the present invention, the propellant 27 is in fluid communication with the bore 26 of the barrel 12.

The propellant 27 may comprise a compressed gas such as, for example, carbon dioxide. Other types of gases may also be employed.

A housing 34 is mounted on the open first end 13 of the barrel 12 for holding the cartridge 26. The housing 34 includes a neck portion 35 and a chamber portion 36. The neck portion 35 is mounted in the open first end 13 of the barrel 12. The neck portion 35 includes opposed first 37 and second 38 ends and a peripheral wall 54 extending between the first 37 and second 38 ends of the neck portion 35 defining a channel 40 of the neck portion 35. The channel 40 extends between and extends through the first 37 and second 38 ends of the neck portion 35 of the housing 34. The channel 40 is in fluid communication with the bore 16 of the barrel 12.

The chamber portion 36 of the housing 34 includes a perimeter wall 41 that is mounted to the first end 37 of the neck portion 35. The perimeter wall 41 includes a perimeter edge 42 defining a chamber 43. In one embodiment of the present invention, the cartridge 26 is removably positioned in the chamber 43. The chamber 43 is in fluid communication with the channel 40 of the housing 34 and with the bore 13 of the barrel 12.

A cap 45 may be provided for selectively closing the chamber 43. The cap 45 may include a base wall 46 and a perimeter wall 47 that is mounted to and extends away from the base wall 46. The perimeter wall 47 of the cap 45 is threadedly coupled to the perimeter wall 41 of the chamber portion 36 of the housing 34.

As illustrated in FIG. 2 a rupturing means 50 may be provided for rupturing the cartridge 26 positioned in the chamber 43. The rupturing means 50 may be mounted to and may extend away from the first end 37 of the neck portion 35 of the housing 34. The rupturing means 50 is preferably positioned about the channel 40 extending through the neck portion 35 of the housing 34.

The rupturing means 50 may include a pointed end 51. The pointed end 51 of the rupturing means 50 includes an opening 52 extending into the rupturing means 50. The rupturing means 50 is in fluid communication with the channel 40.

The peripheral wall 54 of the neck portion 35 of the housing 34 includes an opening 55 extending into a bore 56. The bore 56 of the neck portion 35 of the housing 34 traverses the channel 40 extending through the neck portion 35 of the housing 34.

As illustrated in FIG. 2, an actuating means 58 may be provided for controlling a flow of the propellant 27 through the channel 40 extending through the neck portion 35 of the housing 34. The actuating means 58 is depressibly mounted in the bore 56 extending in the neck portion 35 of the housing 34 and selectively blocks the channel 40.

The actuating means 58 includes a first end 59, a second end 60 and a peripheral side surface 61. The actuating means 58 may include a longitudinal axis extending between the first 59 and second 60 ends of the actuating means 58.

The actuating means 58 may include a protruding portion 62 for selectively receiving a finger of a user. The protruding portion 62 is mounted on the first end 59 of the actuating means 58. The protruding portion 62 preferably extends through the opening 55 in the peripheral wall 54 of the neck portion 35 of the housing 34.

The peripheral side surface 61 of the actuating means 58 may include a channel 63 extending through the actuating means 58. The channel 63 extending through the actuating means 58 is orientated generally perpendicular to the bore 56 extending into the neck portion 35 of the housing 34.

The actuating means 58 is positionable between a depressed position and a released position. In one embodiment of the present invention, the depressed position is characterized by the channel 63 in the actuating means 58 being in registration with the channel 40 extending through the neck portion 35 of the housing 34. The released position is characterized by the actuating means 58 blocking the channel 40 extending through the neck portion 35 of the housing 34.

A biasing means 65 may be provided for biasing the actuating means 58 from the depressed position toward the released position. The biasing means 65 is positioned in the bore 56 extending into the neck portion 35 of the housing 34 and is positioned between an inner surface of the bore 56 and the second end 60 of the actuating means 58. The biasing means 65 may comprise a coiled spring.

In use, the cartridge 26 is positioned in the chamber 43. The cap 45 is threadedly coupled to the housing 34 such that the cartridge 26 engages the rupturing means 50 permitting the propellant 27 to escape from the cartridge 26 and flow through the channel 40 of the neck portion 35 of the housing 34 and to flow through the channel 63 of the actuating means 58 when the actuating means 58 in the depressed position. The propellant 27 then flows through the bore 16 of the barrel 12. The propellant 27 engages and projects the projectile 24 and the coupled fishing line away from the barrel 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic fishing line casting system for casting a fishing line, the fishing line being connected to an elongated fishing pole, the fishing pole having a reel mounted on an end of the fishing pole and a plurality of eyelets being mounted along a length of the fishing pole, wherein the fishing line extends through each of the eyelets, said system comprising:

an elongated barrel having open first and second ends, a peripheral wall extending between said open first and second ends defining a bore extending through said barrel;

a projectile for being propelled from said barrel, said projectile being removably positioned in said bore of said barrel, said projectile being couplable to a portion of the fishing line, wherein said projectile comprises a buoyant bobber adapted to float atop a body of water for supporting an attached portion of the fishing line after being propelled from said barrel;

a cartridge having an interior;

a propellant being positioned in said interior of said cartridge for propelling said projectile from said barrel;

a housing being mounted to said open first end of said barrel for holding said cartridge; and wherein said propellant flows through said bore of said barrel propelling said projectile and the fishing line away from said barrel.

2. The automatic fishing line casting system of claim 1, additionally including a fastening means for removably fastening said barrel to the fishing pole, said fastening means extending between and being removably couplable to the fishing pole and said peripheral wall of said barrel.

3. The automatic fishing line casting system of claim 2, wherein said fastening means includes:
   an annular member being mounted about said barrel;
   a generally arcuate member being removably fastened to the fishing pole; and
   a coupling member being coupled to and extending between said annular member and said arcuate member for positioning said barrel a predetermined distance from the fishing pole.

4. The automatic fishing line casting system of claim 1, wherein said projectile is generally spherical.

5. The automatic fishing line casting system of claim 1, wherein said projectile comprises a generally buoyant material.

6. The automatic fishing line casting system of claim 1, wherein said housing has a neck portion being fluidly coupled to said open first end of said barrel and a chamber portion for holding said cartridge.

7. The automatic fishing line casting system of claim 6, wherein said neck portion has a channel extending through said neck portion, said channel being in fluid communication with said bore of said barrel.

8. The automatic fishing line casting system of claim 7, wherein said chamber portion of said housing has a perimeter wall being mounted to said neck portion, said perimeter wall having a perimeter edge defining a chamber, wherein said cartridge is removably positioned in said chamber, said chamber being in fluid communication with said channel of said housing and with said bore of said barrel.

9. The automatic fishing line casting system of claim 8, additionally including a cap being threadedly coupled to said perimeter wall of said chamber portion of said housing for selectively closing said chamber.

10. The automatic fishing line casting system of claim 9, wherein said cap has a base wall and a perimeter wall being mounted to and extending away from said base wall, said perimeter wall of said cap being threadedly coupled to said perimeter wall of said chamber portion of said housing.

11. The automatic fishing line casting system of claim 1, wherein said propellant comprises a compressed gas.

12. The automatic fishing line casting system of claim 9, additionally including a rupturing means being mounted in said chamber for rupturing said cartridge positioned in said chamber.

13. The automatic fishing line casting system of claim 12, wherein said rupturing means has a pointed end, said pointed end of said rupturing means having a opening extending into said rupturing means, said rupturing means being in fluid communication with said channel, wherein threadedly engaging said cap to said housing selectively engages said cartridge and said rupturing means.

14. The automatic fishing line casting system of claim 8, wherein said perimeter wall of said neck portion of said housing has an opening extending into a bore.

15. The automatic fishing line casting system of claim 14, additionally including an actuating means being depressibly mounted in said bore of said neck portion for controlling a flow of said propellant through said channel of said neck portion of said housing.

16. The automatic fishing line casting system of claim 15, wherein said actuating means has a protruding portion mounted on a first end of said actuating means for selectively receiving a finger of a user, said protruding portion extending through an opening in said peripheral wall of said neck portion of said housing; and
   a peripheral side surface of said actuating means having a channel extending through said actuating means, said channel being orientated generally perpendicular to said bore extending into said neck portion of said housing.

17. The automatic fishing line casting system of claim 16, wherein said actuating means is positionable between a depressed position and a released position, wherein said depressed position is characterized by said channel in said actuating means being in registration with said channel extending through said neck portion of said housing, wherein said released position is characterized by said actuating means blocking said channel extending through said neck portion of said housing, wherein said propellant flows through said channels of said neck portion of said housing and said actuating means when said actuating means in said depressed position.

18. The automatic fishing line casting system of claim 17, additionally including a biasing means being mounted in said bore for biasing said actuating means from said depressed position toward said released position.

19. An automatic fishing line casting system for casting a fishing line, the fishing line being connected to an elongated fishing pole, the fishing pole having a reel mounted on an end of the fishing pole and a plurality of eyelets being mounted along a length of the fishing pole, wherein the fishing line extends through each of the eyelets, said system comprising:
   a barrel having open first and second ends, a peripheral wall extending between said open first and second ends defining a bore extending through said barrel, said barrel having a longitudinal axis extending between said open first and second ends;
   said barrel being generally cylindrical such that said barrel having a generally circular transverse cross section taken substantially perpendicular to said longitudinal axis of said barrel;
   said barrel comprising a substantially rigid material;
   a fastening means for removably fastening said barrel to the fishing pole, said fastening means extending between and being removably couplable to the fishing pole and said peripheral wall of said barrel;
   said fastening means including:
      an annular member being mounted to said peripheral wall of said barrel;
      a generally arcuate member being removably fastenable to the fishing pole;
      a coupling member being coupled to and extending between said annular member and said arcuate member;
   a projectile for being propelled from said barrel, said projectile being removably positioned in said bore of said barrel, said projectile being couplable to a portion of the fishing line, wherein said projectile comprises a substantially lightweight bobber such that said projectile remains afloat atop a body of water thereby supporting the fishing line after being propelled from said barrel;
   a cartridge having a first end, a second end and a peripheral wall extending between said first and second ends of said cartridge defining an interior of said cartridge;

a compressed propellant being positioned in said interior of said cartridge for propelling said projectile from said barrel, wherein said propellant is in fluid communication with said bore of said barrel;

said propellant comprising a compressed gas;

a housing being mounted to said open first end of said barrel for holding said cartridge, said housing having a neck portion and a chamber portion, said neck portion being mounted in said open first end of said barrel;

said neck portion having opposed first and second ends, said neck portion of said housing having a channel extending between and extending through said first and second ends of said neck portion of said housing, said channel being in fluid communication with said bore of said barrel;

said chamber portion of said housing having a perimeter wall being mounted to said first end of said neck portion, said perimeter wall having a perimeter edge defining a chamber, wherein said cartridge is removably positioned in said chamber, said chamber being in fluid communication with said channel of said housing and with said bore of said barrel;

a cap for selectively closing said chamber, said cap having a base wall and a perimeter wall being mounted to and extending away from said base wall, said perimeter wall of said cap being threadedly coupled to said perimeter wall of said chamber portion of said housing;

a rupturing means for rupturing said cartridge positioned in said chamber, said rupturing means being mounted to and extending away from said first end of said neck portion of said housing, said rupturing means being positioned about said channel;

said rupturing means having a pointed end, said pointed end of said rupturing means having a opening extending into said rupturing means, said rupturing means being in fluid communication with said channel, wherein said cartridge is positioned in said chamber, said cap is threadedly coupled to said housing such that said cartridge engages said rupturing means permitting said propellant to escape from said cartridge and flow through said channel of said neck portion of said housing and to flow through said bore of said barrel, wherein said propellant engages and projects said projectile and the fishing line away from said barrel and the fishing pole;

said peripheral wall of said neck portion of said housing having an opening extending into a bore, said bore of said neck portion of said housing traversing said channel extending through said neck portion of said housing;

an actuating means for controlling a flow of said propellant through said channel extending through said neck portion of said housing, said actuating means being depressibly mounted in said bore extending in said neck portion of said housing and selectively blocking said channel;

said actuating means having a first end, a second end and a peripheral side surface, said actuating means having a longitudinal axis extending between said first and second ends of said actuating means;

said actuating means having a protruding portion for selectively receiving a finger of a user, said actuating means being mounted on said first end of said actuating means, said protruding portion extending through said opening in said peripheral wall of said neck portion of said housing;

said peripheral side surface of said actuating means having a channel extending through said actuating means, said channel being orientated generally perpendicular to said bore extending into said neck portion of said housing;

said actuating means being positionable between a depressed position and a released position, wherein said depressed position is characterized by said channel in said actuating means being in registration with said channel extending through said neck portion of said housing, wherein said released position is characterized by said actuating means blocking said channel extending through said neck portion of said housing, wherein said propellant flows through said channels of said neck portion of said housing and said actuating means when said actuating means in said depressed position; and a biasing means for biasing said actuating means from said depressed position toward said released position, said biasing means being positioned in said bore extending into said neck portion of said housing and positioned between an inner surface of said bore and said second end of said actuating means; and said biasing means comprising a coiled spring.

* * * * *